United States Patent
Choi et al.

(10) Patent No.: US 11,248,180 B2
(45) Date of Patent: Feb. 15, 2022

(54) SUPERCRITICAL WATER PROCESS INTEGRATED WITH VISBREAKER

(71) Applicant: Saudi Arabian Oil Company, Dhahran (SA)

(72) Inventors: Ki-Hyouk Choi, Dhahran (SA); Mazin M. Fathi, Dhahran (SA); Mohnnad H. Alabsi, Dhahran (SA); Vinod Ramaseshan, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/148,221

(22) Filed: Jan. 13, 2021

(65) Prior Publication Data

US 2021/0130707 A1 May 6, 2021

Related U.S. Application Data

(63) Continuation of application No. 15/950,787, filed on Apr. 11, 2018, now Pat. No. 10,927,313.

(51) Int. Cl.
*C10G 55/04* (2006.01)
*B01D 11/04* (2006.01)
(Continued)

(52) U.S. Cl.
CPC .......... *C10G 55/04* (2013.01); *B01D 11/0411* (2013.01); *B01J 3/008* (2013.01);
(Continued)

(58) Field of Classification Search
CPC ...... B01J 3/008; B01D 11/0411; C10G 55/00; C10G 55/02; C10G 55/04; C10G 57/00; C10G 9/007
See application file for complete search history.

(56) References Cited

U.S. PATENT DOCUMENTS 4,454,023 A * 6/1984 Lutz ..................... C10G 67/049
                                                            208/106
4,615,791 A    10/1986 Choi et al.
(Continued)

FOREIGN PATENT DOCUMENTS

CA    1314260       3/1993
EP    1361262 A1   11/2003

OTHER PUBLICATIONS

Atsushi Kishita et a., Hydrothermal Visbreaking of Bitumen in Supercritical Water with Alkali, 45 J. of the Japan Pet. Institute 361-367 (2002).
(Continued)

*Primary Examiner* — Prem C Singh
*Assistant Examiner* — Brandi M Doyle
(74) *Attorney, Agent, or Firm* — Bracewell LLP; Constance Gall Rhebergen (57) ABSTRACT

An integrated upgrading process for upgrading a heavy oil, the process comprising the steps of introducing a heavy oil to a visbreaker unit; processing the heavy oil in the visbreaker unit to produce a visbreaker product stream; feeding the visbreaker product stream to a fractionator; separating the visbreaker product stream in the fractionator to produce a bottoms stream, a gas oil stream, a naphtha stream, and a gas product stream; feeding the bottoms stream to a supercritical water unit; and processing the bottoms stream in the supercritical water unit to produce an upgraded bottoms stream.

2 Claims, 8 Drawing Sheets

(51) Int. Cl.
  *B01J 3/00* (2006.01)
  *C10G 7/06* (2006.01)
  *C10G 7/08* (2006.01)
  *C10G 9/00* (2006.01)

(52) U.S. Cl.
  CPC .............. *C10G 7/06* (2013.01); *C10G 7/08* (2013.01); *C10G 9/007* (2013.01); *B01D 2256/24* (2013.01); *B01D 2257/7022* (2013.01); *C10G 2300/107* (2013.01); *C10G 2300/1077* (2013.01); *C10G 2400/06* (2013.01); *C10G 2400/08* (2013.01)

(56) References Cited

U.S. PATENT DOCUMENTS

| | | |
|---|---|---|
| 4,767,521 A | 8/1988 | Feldman et al. |
| 4,773,986 A | 9/1988 | Feldman et al. |
| 4,846,958 A | 7/1989 | Feldman et al. |
| 7,144,498 B2 | 12/2006 | McCall et al. |
| 8,480,765 B2 | 7/2013 | Siskin et al. |
| 2011/0232160 A1 | 9/2011 | Siskin et al. |
| 2012/0061291 A1* | 3/2012 | Choi .................. C10G 49/22 208/53 |
| 2013/0140214 A1 | 6/2013 | Choi |
| 2015/0321975 A1* | 11/2015 | Choi .................. C07C 4/04 585/400 |
| 2016/0108324 A1* | 4/2016 | Johnsen .............. C10G 9/007 166/267 |
| 2016/0137931 A1 | 5/2016 | Kumar et al. |
| 2016/0145499 A1 | 5/2016 | Choi et al. |
| 2017/0275535 A1 | 9/2017 | Bunio et al. |

OTHER PUBLICATIONS

The International Search Report and Written Opinion for related PCT application PCT/US2019/026883 dated Jun. 21, 2019. (SA5825).

* cited by examiner

SUPERCRITICAL WATER PROCESS INTEGRATED WITH VISBREAKER

CROSS-REFERENCE TO RELATED APPLICATIONS

This patent application is a continuation of U.S. Non-Provisional patent application Ser. No. 15/950,787 filed on Apr. 11, 2018. For purposes of United States patent practice, the non-provisional application is incorporated by reference in its entirety.

TECHNICAL FIELD

Disclosed are methods for upgrading petroleum. Specifically, disclosed are integrated methods and systems for upgrading petroleum.

BACKGROUND

Visbreaking is a thermal cracking process. The primary objective of a visbreaker is to reduce viscosity of the heavy residue feed.

Visbreaking differs from conventional coking in that visbreaking produces a lesser amount of coke as compared to conventional coking. In contrast to a batch-wise coking operation, such as a delayed coker, a visbreaker can operate continuously because coke materials are discharged with unconverted heavy fractions. However, due to the severity in the visbreaker, the conversion of the heavy fraction is limited. Conversion of a heavy fraction in a delayed coker is between 70 percent (%) by weight and 80% by weight, while conversion of a heavy fraction in a visbreaker is about 40% by weight.

In general, visbreaker can be operated at a temperature between 450 deg C. and 500 deg C. with a residence time between 1 minute and 20 minutes, making the visbreaker a standard severity process unit. The reaction temperature in a visbreaker requires a longer residence time to reduce viscosity of the feed. Increasing the temperature and the residence time, in other words increasing the severity, can increase the naphtha and diesel range products but can result in reduced stability of fuel oil and increased coke production. Unstable fuel oil can cause gum formation due to oxidation by air of the unsaturated compounds, such as olefins in the fuel oil. Increased severity in the visbreaker can increase the amount of unsaturated bonds in the fuel oil. Coke is a low economic component and can cause plugging problems in the process.

Processes to pre-treat streams to visbreakers often employ physical separation methods, such as distillation. As a result, these processes result in loss of yield. Processes to increase severity in a visbreaker also can result in reduced yield.

SUMMARY

Disclosed are methods for upgrading petroleum. Specifically, disclosed are integrated methods and systems for upgrading petroleum.

In a first aspect, an integrated upgrading process for upgrading a heavy oil is provided. The process includes the steps of introducing a heavy oil to a visbreaker unit, processing the heavy oil in the visbreaker unit to produce a visbreaker product stream, feeding the visbreaker product stream to a fractionator, separating the visbreaker product stream in the fractionator to produce a bottoms stream, a gas oil stream, a naphtha stream, and a gas product stream, feeding the bottoms stream to a supercritical water unit, and processing the bottoms stream in the supercritical water unit to produce an upgraded bottoms stream.

In certain aspects, the heavy oil is selected from the group consisting of a vacuum residue, an atmospheric residue, a fluid catalytic cracking clarified slurry oil having a T5% cut point of greater than 600 deg F., a naphtha steam cracker pyrolysis fuel oil, and residue streams. In certain aspects, the fractionator includes a separator that separates based on boiling point. In certain aspects, the gas oil stream includes hydrocarbons with a T95% cut point of 600 deg F. In certain aspects, the naphtha stream includes hydrocarbons with a T95% cut point of 350 deg F. In certain aspects, the visbreaker unit includes a furnace, wherein the furnace operates at a temperature in the range between 400 deg C. and 500 deg C. In certain aspects, the supercritical water unit includes a supercritical water reactor, wherein the supercritical water reactor can operate a temperature in the range between 380 deg C. and 600 deg C. In certain aspects, the process further includes the steps of introducing the upgraded bottoms stream to a bottoms separator, and separating the upgraded bottoms stream in the bottoms separator to produce a resid fraction. In certain aspects, the process further includes the steps of mixing the resid fraction and the heavy oil to produce a mixed feed stream, and introducing the mixed feed stream to the visbreaker unit. In certain aspects, the resid fraction includes hydrocarbons having a T5% cut point in the range between 600 deg F. and 1050 deg F. In certain aspects, the process further includes the steps of mixing the resid fraction and a hydrogen donor stream to produce a mixed resid fraction, mixing the mixed resid fraction and the heavy oil to a produce hydrogen mixed feed stream, and introducing the hydrogen mixed feed stream to the visbreaker unit. The integrated process of claim 4, wherein the hydrogen donor stream is selected from the group consisting of an FCC clarified slurry oil, a hydrocracker bottom, and a steam cracker bottom. In certain aspects, the process further includes the steps of mixing a cutterstock stream and the bottoms stream to produce a mixed bottom fraction, and introducing the mixed bottom fraction to the supercritical water unit. In certain aspects, the cutterstock stream is selected from the group consisting of straight run gas oil, FCC light cycle oil having an aromatic content of greater than 40 wt %, a naphtha-containing stream, and a gas oil-containing stream. In certain aspects, the mixed bottom fraction has a viscosity of less than 800 cSt at 122 deg F.

In a second aspect, an integrated upgrading process for upgrading a heavy oil is provided. The method includes the steps of introducing a heavy oil to a supercritical water unit, processing the heavy oil in the supercritical water unit to produce an upgraded heavy oil, introducing the upgraded heavy oil to a visbreaker unit, processing the upgraded heavy oil in the visbreaker unit to produce a visbreaker effluent stream, introducing the visbreaker effluent stream to a fractionator, and separating the visbreaker effluent stream in the fractionator to produce a bottoms stream.

In a third aspect, an integrated upgrading process for upgrading a heavy oil is provided. The method includes the steps of introducing a heavy oil to a supercritical water unit, processing the heavy oil in the supercritical water unit to produce an upgraded heavy oil, mixing the upgraded heavy oil with a visbreaker product to produce a mixed product stream, introducing the mixed product stream to a fractionator, separating the mixed product stream in the fractionator to produce a bottom fraction, separating a bottom split stream from the bottom fraction, introducing a bottom fraction to a visbreaker unit, and processing the bottom fraction in the visbreaker unit to produce the visbreaker product.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

Described here are processes and systems for upgrading a heavy oil with an integrated upgrading process containing a visbreaker unit and a supercritical water unit.

Advantageously, the integration of a visbreaker unit with a supercritical water unit increases the yield as compared to a visbreaker alone. Advantageously, the integrated upgrading process can increase distillate yield, can improve fuel oil stability, and can allow operation of the visbreaker unit at low severity conditions as compared to process a heavy oil in a visbreaker unit alone. Advantageously, the integrated upgrading process produces products with improved economic value and improved refining margin. Advantageously, the heavy fraction produced by the integrated upgrading process has increased economic value as compared to the heavy fraction in the heavy oil. Advantageously, processing the heavy oil in the integrated upgrading process upgrades the vacuum residue fraction in the heavy oil without increasing the severity of the visbreaker unit. Advantageously, heat integration can be used to reduce the overall energy consumption.

Advantageously, the integrated upgrading process can increase the stability of the gas oil fraction produced by the integrated upgrading process. The product from a supercritical water unit can contain unsaturated bonds, due to the limited availability of hydrogen, making the product unstable in air because of the potential for gum formation from oxidation. In a visbreaker unit, unsaturated bonds can be converted to aromatics or can be condensed to polynuclear aromatics. Thus, combining the supercritical water unit and the visbreaker unit can increase the stability of the product.

Advantageously, the integrated upgrading process utilizes the bottom fraction from the visbreaker unit which can increase the overall yield. In standalone visbreaker units, the bottom fraction is regarded as a "garbage stream" containing unsaleable, useless hydrocarbon compounds. Advantageously, the integrated upgrading process identified that the bottom fraction contains an amount of alkyl groups that can be cracked in a supercritical water unit.

Thermal cracking of hydrocarbons in supercritical water is different from conventional thermal processes such as coking and visbreaking. Hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Supercritical water is water at a temperature at or greater than the critical temperature of water and at a pressure at or greater than the critical pressure of water. The critical temperature of water is 373.946° C. The critical pressure of water is 22.06 megapascals (MPa). Advantageously, the dielectric constant of supercritical water enables hydrocarbons to be dissolved in it. Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water gas shift reaction.

Without being bound to a particular theory, it is understood that the basic reaction mechanism of supercritical water mediated petroleum processes is the same as a free radical reaction mechanism. Radical reactions include initiation, propagation, and termination steps. With hydrocarbons, especially heavy molecules such as C10+, initiation is the most difficult step. Initiation requires the breaking of chemical bonds. The bond energy of carbon-carbon bonds is about 350 kJ/mol, while the bond energy of carbon-hydrogen is about 420 kJ/mol. Due to the chemical bond energies, carbon-carbon bonds and carbon-hydrogen bonds do not break easily at the temperatures in a supercritical water process, 380 deg C. to 450 deg C., without catalyst or radical initiators. In contrast, carbon-sulfur bonds have a bond energy of about 250 kJ/mol.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions. Supercritical water, having low dielectric constant, dissolves hydrocarbons and surrounds radicals to prevent the inter-radical reaction, which is the termination reaction resulting in condensation (dimerization or polymerization). Because of the barrier set by the supercritical water cage, hydrocarbon radical transfer is more difficult in supercritical water as compared to compared to conventional thermal cracking processes, such as delayed coker, where radicals travel freely without such barriers.

As used throughout, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen, gas ($H_2$) or liquid, such that no hydrogen (in the form $H_2$) is a feed or a part of a feed to the reactor.

As used throughout, "external supply of catalyst" refers to the addition of catalyst to the feed to the reactor or the presence of a catalyst in the reactor, such as a fixed bed catalyst in the reactor. For example, a reactor in the absence of an external supply of catalyst means no catalyst has been added to the feed to the reactor and the reactor does not contain a catalyst bed in the reactor.

As used throughout, "atmospheric residue" or "atmospheric residue fraction" refers to the fraction of oil-containing streams having a T5% cut point of 600 deg F., such that all of the hydrocarbons have boiling points greater than 600 deg F., and alternately a T5% cut point of 650 deg F., such that all of the hydrocarbons have boiling points greater than 650 deg F. The atmospheric residue includes the vacuum residue fraction. Atmospheric residue can refer to the composition of an entire stream, such as when the feedstock is from an atmospheric distillation unit, or can refer to a fraction of a stream, such as when a whole range crude is used.

As used throughout, "vacuum residue" or "vacuum residue fraction" refers to the fraction of oil-containing streams having a T5% cut point of greater than 900 deg F., such that all of the hydrocarbons have boiling points greater than 900 deg F., and alternately, a T5% cut point of greater than 1050 deg F., such that all of the hydrocarbons have boiling points greater than 1050 deg F. Vacuum residue can refer to the composition of an entire stream, such as when the feedstock is from a vacuum distillation unit or can refer to a fraction of stream, such as when a whole range crude is used.

As used throughout, "T5% cut point" refers to the True Boiling Point (TBP) at which 5% of the volume of oil can be recovered. Cut points refer to the temperature that represents the limits of a distillate fraction.

As used throughout, "T95% cut point" refers to the True Boiling Point (TBP) at which 95% of the volume of oil can be recovered. Cut points refer to the temperature that represents the limits of a distillate fraction.

As used throughout, "asphaltene" refers to the fraction of an oil-containing stream, which is not soluble in a n-alkane, such as n-pentane or more particularly, n-heptane.

As used throughout, "heavy fraction" refers to the fraction in the petroleum feed having a true boiling point (TBP) 10% that is equal to or greater than 650 deg F. (343 deg C.), and alternately equal to or greater than 1050 deg F. (566 deg C.). Examples of a heavy fraction can include the atmospheric residue fraction or vacuum residue fraction. The heavy fraction can include components from the petroleum feed that were not converted in the supercritical water reactor. The heavy fraction can also include hydrocarbons that were dimerized or oligomerized in the supercritical water reactor due to either lack of hydrogenation or resistance to thermal cracking.

As used throughout, "light fraction" refers to the fraction in the petroleum feed that is not considered the heavy fraction. For example, when the heavy fraction refers to the fraction having a TBP 10% that is equal to or greater than 650 deg F. the light fraction has a TBP 90% that is less than 650 deg F. For example, when the heavy fraction refers to the fraction having a TBP 10% equal to or greater than 1050 deg F. the light fraction has a TBP 90% that is less than 1050 deg F.

As used throughout, "distillable fraction" or "distillate" refers to the hydrocarbon fraction lighter than the distillation residue from an atmospheric distillation process or a vacuum distillation process.

As used throughout, "coke" refers to the toluene insoluble material present in petroleum.

As used throughout, "cracking" refers to the breaking of hydrocarbons into smaller ones containing few carbon atoms due to the breaking of carbon-carbon bonds.

As used throughout, "upgrade" means one or all of increasing API gravity, decreasing the amount of impurities, such as sulfur, nitrogen, and metals, decreasing the amount of asphaltene, and increasing the amount of distillate in a process outlet stream relative to the process feed stream. One of skill in the art understands that upgrade can have a relative meaning such that a stream can be upgraded in comparison to another stream, but can still contain undesirable components such as impurities.

As used here, "conversion reactions" refers to reactions that can upgrade a hydrocarbon stream including cracking, isomerization, alkylation, dimerization, aromatization, cyclization, desulfurization, denitrogenation, deasphalting, and demetallization.

As used throughout, "severity" refers to the operating conditions in the visbreaker unit including temperature and residence time. High severity refers to operating the visbreaker unit at temperatures greater than 500 deg, at residence time greater than 20 minutes, and combinations of the same. Low severity refers to operating the visbreaker unit at temperatures less than 400 deg C., at residence time between 1 minute and 20 minutes, and combinations of the same. Standard severity refers to operating the visbreaker unit at temperature between 400 deg C. and 500 deg C. and a residence time between 1 minute and 20 minutes.

The following embodiments, provided with reference to the figures, describe the upgrading process.

Figure 1:
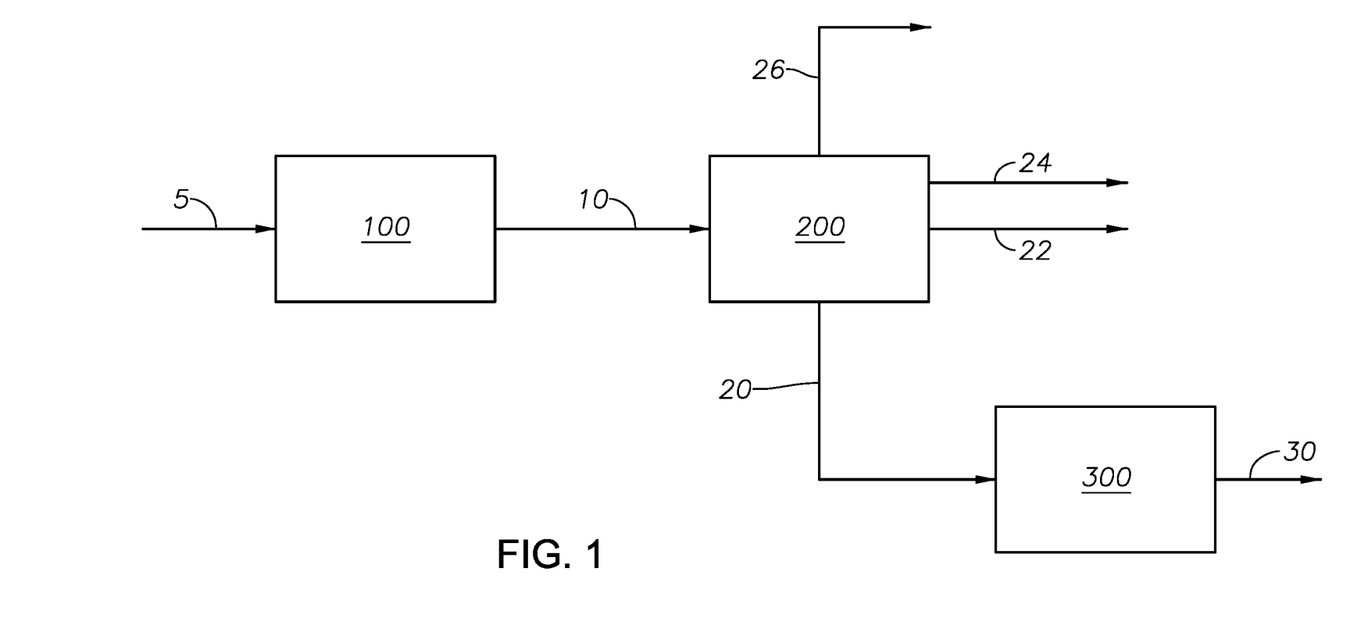
FIG. 1 provides a process diagram of an embodiment of the process.

Referring to FIG. 1, a process flow diagram of an integrated upgrading process is provided. Heavy oil 5 is introduced to visbreaker unit 100. Heavy oil 5 can be derived from any type of petroleum-containing stream. Examples of heavy oil 5 can include vacuum residue, atmospheric residue, a fluid catalytic cracking (FCC) clarified slurry oil having a T5% cut point of greater than 600 deg F., a naphtha steam cracker pyrolysis fuel oil, and residue streams. In at least one embodiment, the oxygen concentration of heavy oil 5 is less than 2 wt %. Maintaining the oxygen concentration of heavy oil 5 at less than 2 wt % can reduce coke formation, can reduce the potential to oxidize the oil, and increase liquid oil yield. The residue stream can be any stream with a T5% cut point of greater than 600 deg Fahrenheit (deg F.) from a refinery, petrochemical plant, coal liquefaction process, and biomass refinery.

Visbreaker unit 100 can be any type of thermal cracking process capable of cracking large molecules into smaller molecules while coke and gases are generated. Visbreaking differs from conventional coking because visbreaking produces a lesser amount of coke is produced in visbreaking than in conventional coking. In at least one embodiment, visbreaker unit 100 can be described with reference to FIG. 2. Heavy oil 5 can be introduced to furnace 110. The temperature in furnace 110 of visbreaker unit 100 can be between 400 degrees Celsius (deg C.) and 500 deg C. Heavy oil 5 can be processed in furnace 110 to produce furnace effluent 115. Furnace effluent 115 can be introduced to soaker 120. The temperature in soaker 120 of visbreaker unit 100 can be between 380 deg C. and 480 deg C. The pressure in visbreaker unit 100 can be between 2 and 50 kilograms per square centimeter (kg/cm²). The residence time in soaker 120 can be between 1 minute and 50 minutes. Furnace effluent 115 can be processed in soaker 120 to produce visbreaker product stream 10. Visbreaker unit 100 can include additional equipment, such as pumps, heat exchangers, separators, and combinations of the same.

Returning to FIG. 1, heavy oil 5 is processed in visbreaker unit 100 to produce visbreaker product stream 10.

Visbreaker product stream 10 can be introduced to fractionator 200. Fractionator 200 can be any type of separator capable of separating a hydrocarbon stream into different fractions. In at least one embodiment, fractionator 200 can be a separator capable of separating visbreaker product stream 10 by boiling point. In at least one embodiment, fractionator 200 can include one or more fractionation units. In at least one embodiment, fractionator 200 can include a combination of atmospheric fractionation units and vacuum fractionation units, such that fractionator 200 has a pressure from between 1 atmosphere and 0.014 atmospheres. Lighter products, such as the gas product stream, naphtha stream, and diesel fraction, can be separated in the atmospheric fractionation unit. Heavy products, such as heavy vacuum gas oil and vacuum tar can be separated in the vacuum fractionation unit. In at least one embodiment, fractionator 200 is in the absence of a solvent-based separation process. Visbreaker product stream 10 is separated in fractionator 200 to produce gas oil stream 22, naphtha stream 24, gas product stream 26, and an upgraded bottoms stream 30. Gas product stream 26 can have a T95% cut point of 80 deg F. Naphtha stream 24 can have a T95% cut point of 350 deg F. Gas oil stream 22 can have a T95% cut point of 600 deg F., alternately of 650 deg F., alternately 900 deg F., and alternately 1050 deg F. In at least one embodiment, gas oil stream 22 can have a T95% cut point of between 600 deg F. and 650 deg F. and fractionator 200 additionally can separate a vacuum gas oil with a T95% cut point of between 900 deg F. and 1050 deg F. Gas oil stream 22 can have increased stability as compared to the same fraction in heavy oil 5. Naphtha stream 24 can have an increased yield as compared to the naphtha stream separated from a process containing a visbreaker alone.

Bottoms stream 20 contains the remaining hydrocarbons from visbreaker product stream 10. In at least one embodiment, the T5% cut point of bottoms stream 20 is greater than 600 deg F. In at least one embodiment, the T5% cut point of bottoms stream 20 is greater than 650 deg F. In at least one embodiment, the T5% cut point of bottoms stream 20 is greater than 900 deg F. In at least one embodiment, the T5% cut point of bottoms stream 20 is greater than 1050 deg F.

Bottoms stream 20 can be introduced to supercritical water unit 300. Bottoms stream 20 is processed in supercritical water unit 300 to produce upgraded bottoms stream 30. Supercritical water unit 300 can be described with reference to FIG. 3.

Figure 3:
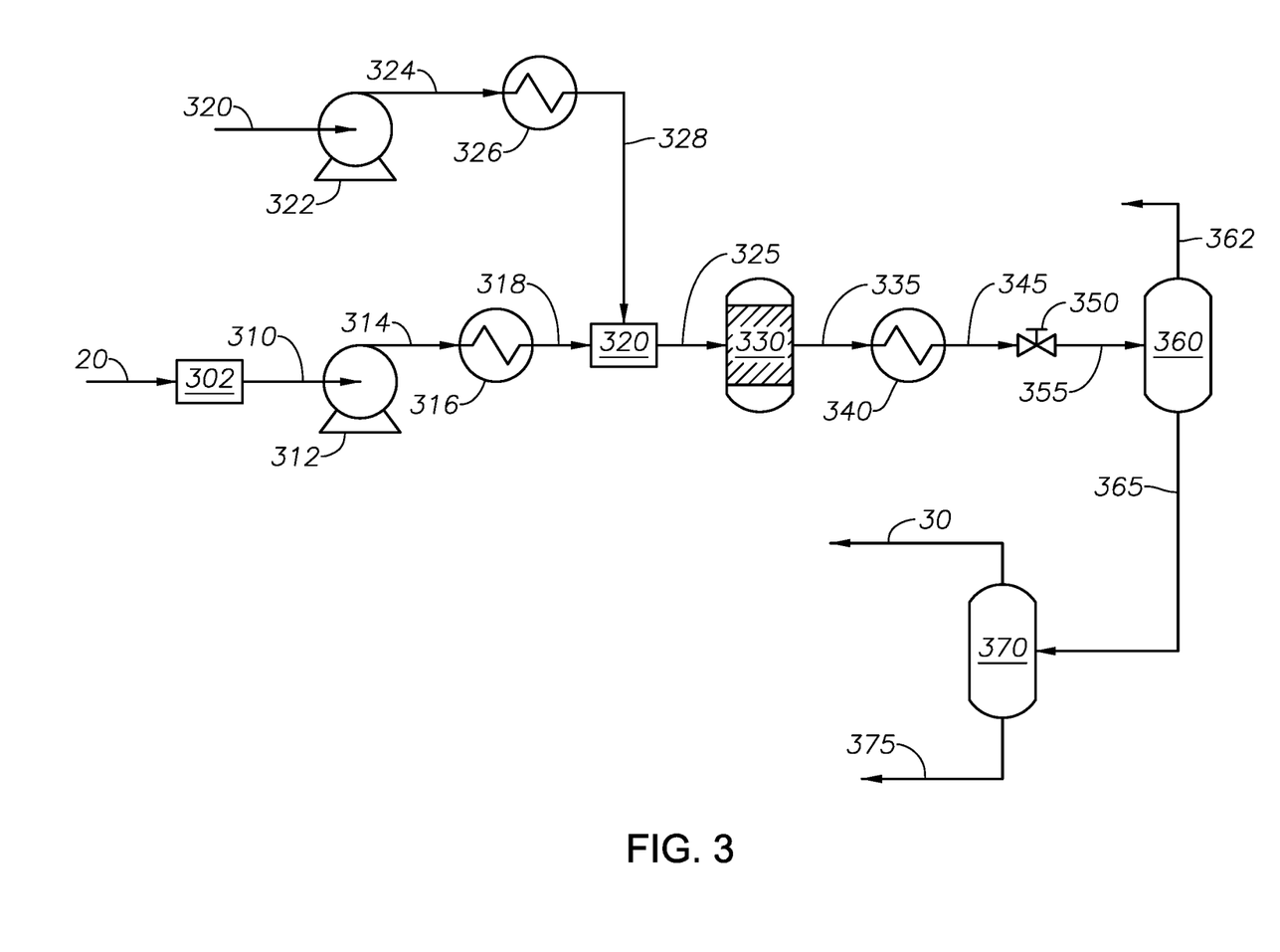
FIG. 3 provides a process diagram of an embodiment of the process.

Bottoms stream 20 can be introduced to filter 302. Filter 302 can be any type of filtering device capable of separating solid particles from a hydrocarbon-containing stream. Bottoms stream 20 can contain solid particles that should be removed to avoid plugging the process lines in supercritical water unit 300. The solid particles can include coke particles, mineral particles, and combinations of the same. The mineral particles can include coke along with vanadium, nickel, sodium, iron, and combinations of the same. Filter 302 can include meshes to separate solid particles. In at least one embodiment, filter 302 can separate solid particles having a size greater than a 35 mesh (a 0.5 mm opening). In at least one embodiment, filter 302 can separate solid particles having a size greater than an 80 mesh (alternately 0.177 mm opening). In at least one embodiment, filter 302 can include one or more meshes in a series. In at least one embodiment, filter 302 can include a first mesh having a 6 mm opening followed by a second mesh having a 0.5 mm opening or smaller. Filter 302 can separate solid particles from bottoms stream 20 to produce clean bottoms stream 310. Clean bottoms stream 310 can be passed to high pressure pump 312. High pressure pump 312 can be any type of pump capable of increasing the pressure of clean bottoms stream 310. In at least one embodiment, high pressure pump 312 is a diaphragm metering pump. The pressure of clean bottoms stream 312 can be increased in high pressure pump 312 to produce pressurized bottoms stream 314. The pressure of pressurized bottoms stream 314 can be greater than the critical pressure of water, alternately between 23 megapascals (MPa) and 27 MPa. Pressurized bottoms stream 314 can be introduced to oil heater 316.

Oil heater 316 can be any type of heat exchanger capable increasing the temperature of pressurized bottoms stream 314. Examples of heat exchangers capable of being used as oil heater 316 can include an electric heater, a fired heater, and a cross exchanger. In at least one embodiment, oil heater 316 can be cross exchanged with reactor effluent 335. The temperature of pressurized bottoms stream 314 can be increased in oil heater 316 to produce hot bottoms stream 318. The temperature of hot bottoms stream 318 can be between 50 deg C. and 250 deg C. Maintaining the temperature of hot bottoms stream 318 at less than 300 deg C. reduces the formation of coke in hot bottoms stream 318 and in supercritical water reactor 330.

Water feed 320 is introduced to supercritical water unit 300 through water pump 322. Water feed 320 can be a demineralized water having a conductivity less than 1.0 microSiemens per centimeter (µS/cm), alternately less 0.5 µS/cm, and alternately less than 0.1 µS/cm. In at least one embodiment, water feed 320 is demineralized water having a conductivity less than 0.1 µS/cm. Water feed 320 can have a sodium content of less than 5 micrograms per liter (µg/L) and alternately less than 1 µg/L. Water feed 320 can have a chloride content of less than 5 µg/L and alternately less than 1 µg/L. Water feed 320 can have a silica content of less than 3 µg/L.

Water pump 322 can be any type of pump capable of increasing the pressure of water feed 320. In at least one embodiment, water pump 322 is a diaphragm metering pump. The pressure of water feed 320 can be increased in water pump 322 to produce pressurized water 324. The pressure of pressurized water 324 can be greater than the critical pressure of water and alternately between 23 MPa and 27 MPa. Pressurized water 324 can be introduced to water heater 326. The pressure can be maintained from water pump 322 and high pressure pump 312 until depressurizing device 350.

Water heater 326 can be any type of heat exchanger capable of increasing the temperature of pressurized water 324. Examples of heat exchangers that can be used as water heater 326 can include an electric heater and a fired heater. The temperature of pressurized water 324 can be increased in water heater 326 to produce supercritical water stream 328. The temperature of supercritical water stream 328 can be equal to or greater than the critical temperature of water, alternately between 374 deg C. and 600 deg C., and alternately between 400 deg C. and 550 deg C.

Hot bottoms stream 318 and supercritical water stream 328 can be introduced to mixer 320. Mixer 320 can mix hot bottoms stream 318 and supercritical water stream 328 to produce mixed feed 325. Mixer 320 can be any type of mixing device capable of mixing a petroleum stream and a supercritical water stream. Examples of mixing devices suitable for use as mixer 320 can include a static mixer, an inline mixer, and impeller-embedded mixer. The ratio of the volumetric flow rate of hot bottoms stream 318 to supercritical water stream 328 can be between 1:10 and 10:1 at standard ambient temperature and ambient pressure (SATP), alternately between 1:5 and 5:1 at SATP, and alternately between 1:4 to 1:2 at SATP. In at least one embodiment, the volumetric flow rate of hot bottoms stream 318 to supercritical water stream 328 is such that the volumetric flow rate of water is greater than the volumetric flow rate of hydrocarbons. The pressure of mixed feed 325 can be greater than the critical pressure of water. The temperature of mixed feed 325 can depend on the temperatures of supercritical water stream 328 and hot bottoms stream 318. Mixed feed 325 can be introduced to supercritical water reactor 330.

Supercritical water reactor 330 can include one or more reactors in series. Supercritical water reactor 330 can be any type of reactor capable of allowing conversion reactions. Examples of reactors suitable for use in supercritical water reactor 330 can include tubular-type, vessel-type, and combinations of the same. Supercritical water reactor 330 can include an upflow reactor, a downflow reactor, and a combination of at least one upflow reactor and at least one downflow reactor. In at least one embodiment, supercritical water reactor 330 includes an upflow reactor, which advantageously prevents channeling of reactants resulting in an increased reaction yield. Supercritical water reactor 330 is in the absence of an external supply of catalyst. In at least one embodiment, supercritical water reactor 330 is in the absence of an external supply of hydrogen. In at least one embodiment, supercritical water reactor 330 can be sized to maintain a Reynolds number greater than 4,000. The Reynolds number can be calculated by assuming the internal fluid in supercritical water reactor 330 is water.

The temperature in supercritical water reactor 330 can be maintained at greater than the critical temperature of water, alternately in the range between 380 deg C. and 600 deg C., and alternately in the range between 390 deg C. and 450 deg C. In at least one embodiment, the temperature in supercritical water reactor 330 is in the range between 390 deg C. and 450 deg C. The temperature in the reactor is determined by the temperature of the internal fluid in supercritical water reactor 330. The pressure in supercritical water reactor 330 can be determined by the pressure of mixed feed 325 and can be maintained by depressurizing device 350. The residence time of the reactants in supercritical water reactor 330 can between 10 seconds and 60 minutes and alternately between 5 minutes and 30 minutes. In at least one embodiment, the residence time in supercritical water reactor 330 is between 5 minutes and 30 minutes. The residence time is calculated by assuming that the density of the reactants in supercritical water reactor 330 is the same as the density of water at the operating conditions of supercritical water reactor 330.

The reactants in supercritical water reactor 330 can undergo conversion reactions to produce reactor effluent 335. Reactor effluent 335 can be introduced to cooling device 340.

Cooling device 340 can be any type of heat exchange device capable of reducing the temperature of reactor effluent 335. Examples of cooling device 340 can include double pipe type exchanger and shell-and-tube type exchanger. In at least one embodiment, cooling device 340 can be a cross exchanger with pressurized bottoms stream 314. The temperature of reactor effluent 335 can be reduced in cooling device 340 to produce cooled stream 345. The temperature of cooled stream 345 can be between 10 deg C. and 300 deg C., alternately between 30 deg C. and 150 deg C., and alternately between 200 deg C. and 300 deg C. Cooled stream 345 can be introduced to depressurizing device 350.

Depressurizing device 350 can be any type of device capable of reducing the pressure of a fluid stream. Examples of depressurizing device 350 can include a pressure letdown valve, a pressure control valve, and a back pressure regulator. The pressure of cooled stream 345 can be reduced to produce discharged stream 355. Discharged stream 355 can be between 0 pounds per square inch gauge (psig) and 300 psig. In at least one embodiment, discharged stream 355 can be at atmospheric pressure. Discharged stream 355 can be introduced to gas-liquid separator 360.

Gas-liquid separator 360 can be any type of separation device capable of separating a fluid stream into gas phase and liquid phase. Discharged stream 355 can be separated to produce gas phase stream 362 and liquid phase stream 365. Liquid phase stream 365 can be introduced to oil-water separator 370.

Oil-water separator 370 can be any type of separation device capable of separating a fluid stream into a hydrocarbon containing stream and a water stream. Liquid phase stream 365 can be separated in oil-water separator 370 to produce upgraded bottoms stream 30 and used water stream 375. Upgraded bottoms stream 30 can contain less than 0.3 wt % water, alternately less than 0.2 wt % water, and alternately less than 0.1 wt % water.

Figure 4:
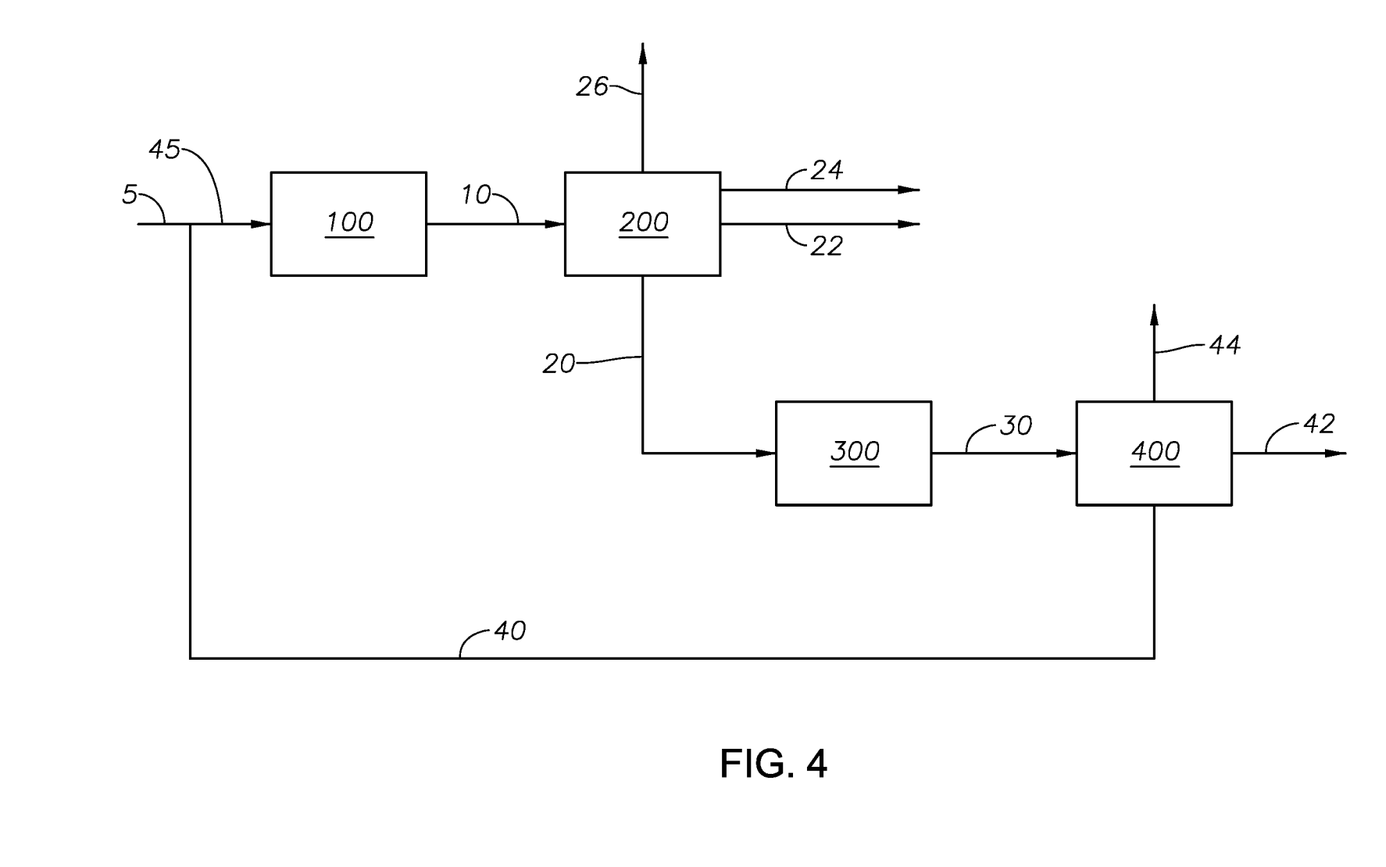
FIG. 4 provides a process diagram of an embodiment of the process.

An alternate embodiment is described with reference to FIG. 4 and FIG. 1, upgraded bottoms stream 30 can be introduced to bottoms separator 400. Bottoms separator 400 can be any type of separation unit capable of separating a hydrocarbon stream based on a boiling point of the hydrocarbons. Bottoms separator 400 can separate upgraded bottoms stream 30 to produce resid fraction 40, supercritical water (SCW)-gas oil 42 and SCW-naphtha 44. Resid fraction 40 can have a T5% cut point in the range between 600 deg F. and 1050 deg F. Resid fraction 40 can contain less than 2 wt % water. Resid fraction 40 can be mixed with heavy oil 5 to produce mixed feed stream 45. Resid fraction 40 and heavy oil 5 can be mixed in any kind of mixer capable of mixing two hydrocarbon streams. Mixed feed stream 45 can be introduced to visbreaker unit 100. Advantageously, water in the resid fraction 40 can impart a beneficial effect as a hydrogen donor in visbreaker unit 100. The presence of a hydrogen donor can increase the efficiency of the conversion reactions providing hydrogen, which can be scarce in a visbreaker.

In at least one embodiment, supercritical water unit 300 can be operated in the absence of an oil-water separator 370. Gas-liquid separator 360 can be operated such that greater than 98 wt % of the water in discharged stream 355 exits gas-liquid separator 360 in gas phase stream 362. Liquid phase stream 365, containing less than 2 wt % water, can be introduced to bottoms separator 400. Liquid phase stream 365 can be separated in bottoms separator 400 to produce resid fraction 40, SCW-gas oil 42, and SCW-naphtha 44, where bottoms separator 400 can be operated as described with reference to FIG. 3.

Figure 5:
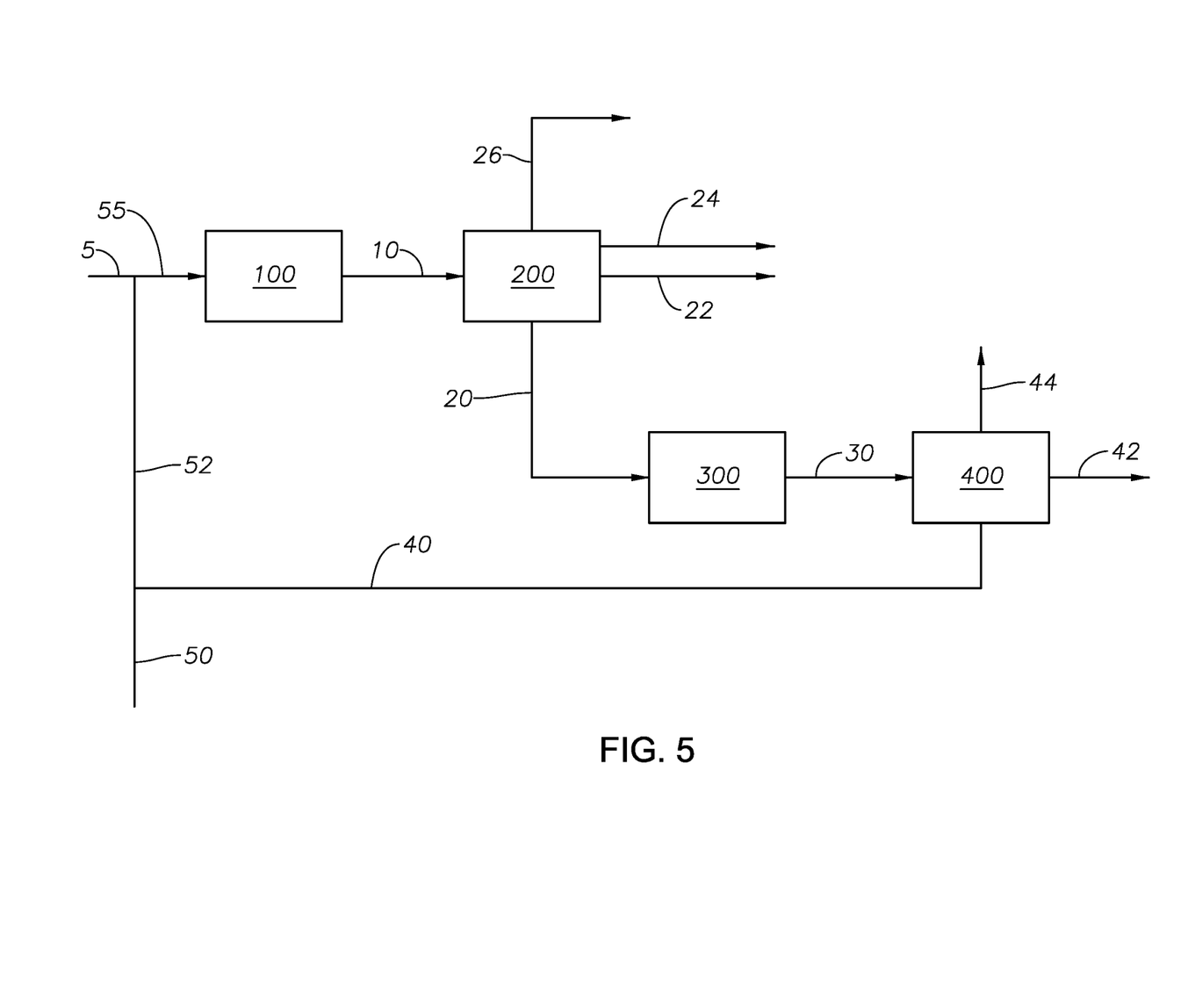
FIG. 5 provides a process diagram of an embodiment of the process.

An alternate embodiment is described with reference to FIG. 5 and referring to FIG. 1, and FIG. 4, resid fraction 40 can be mixed with hydrogen donor stream 50 to produce mixed resid fraction 52. Hydrogen donor stream 50 can be any type of hydrocarbon-containing stream with hydrocarbons capable of donating hydrogens. Examples of hydrogen donor streams can include FCC clarified slurry oil, hydrocracker bottom, and stream cracker bottom. Resid fraction 40 and hydrogen donor stream 50 can be mixed in any type of mixing unit capable of mixing two hydrocarbon streams. Mixed resid fraction 52 can be mixed with heavy oil 5 to produce hydrogen mixed feed stream 55. Mixed resid fraction 52 and heavy oil 5 can be mixed in any kind of mixer capable of mixing two hydrocarbon streams. Hydrogen mixed feed stream 55 can be introduced to visbreaker unit 100.

Figure 6:
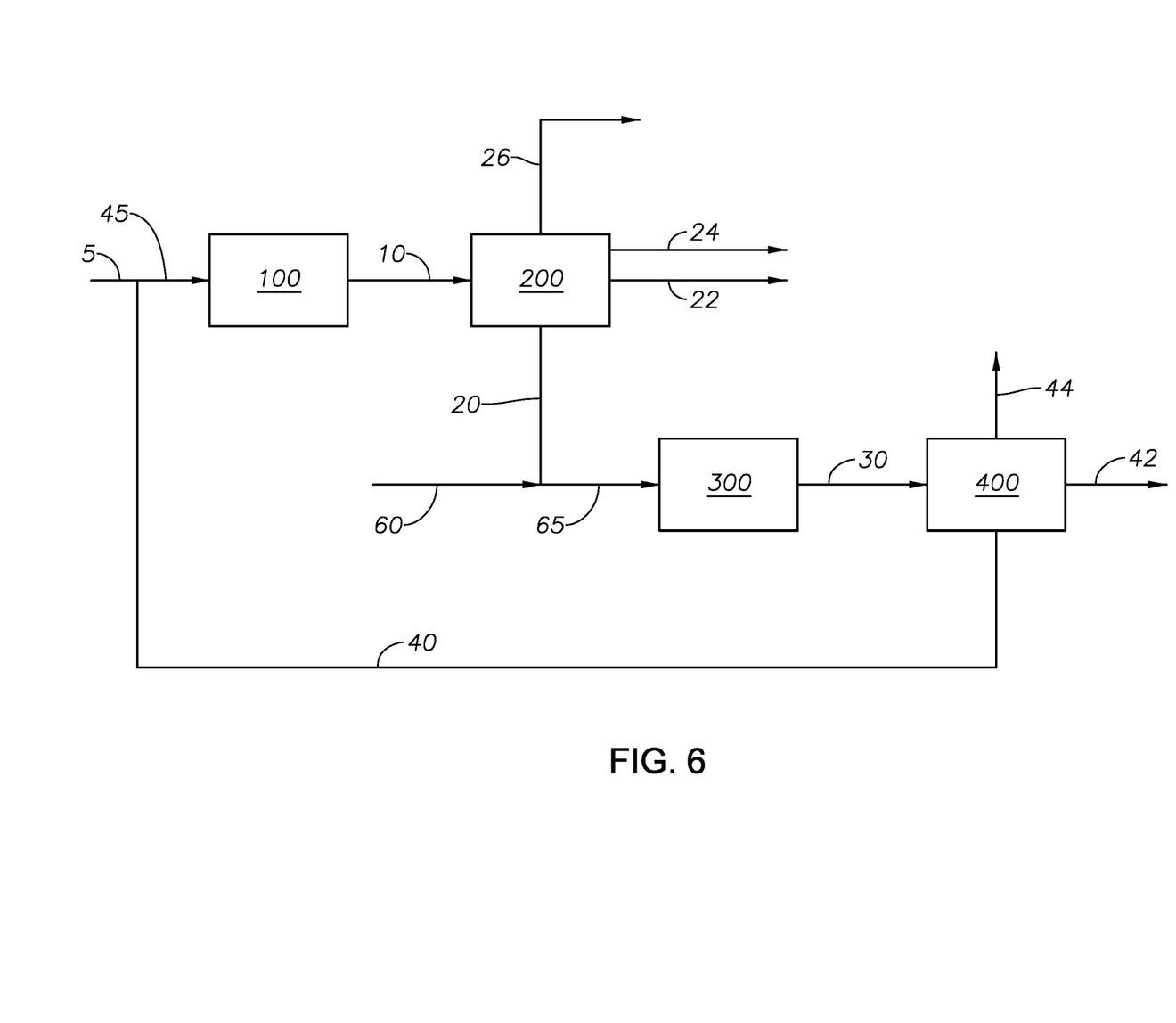
FIG. 6 provides a process diagram of an embodiment of the process.

An alternate embodiment is described with reference to FIG. 6 and referring to FIG. 1 and FIG. 4. Cutterstock stream 60 can be mixed with bottoms stream 20 to produce mixed bottom fraction 65. Cutterstock stream 60 can be any hydrocarbon stream with low viscosity. Examples of cutterstock can include straight run gas oil, FCC light cycle oil having an aromatic content of greater than 40 wt %, a naphtha-containing stream, and a gas oil-containing stream. Mixing cutterstock stream 60 with bottoms stream 20 can reduce the viscosity of bottoms stream 20, such that mixed bottom fraction 65 has a reduced viscosity as compared to bottoms stream 20. The viscosity of mixed bottom fraction 65 can be less than 800 cSt at 122 deg F. and alternately less than 600 cSt at 122 deg F. Additionally, bottoms stream 20 can contain amounts of asphaltenes and toluene insoluble fraction, which are precursors to the formation of coke. Mixed bottom fraction 65 can have a reduced viscosity relative to bottoms stream 20 resulting in increased filtration of solids from mixed bottom fraction 65 in supercritical water unit 300. Increased filtration of solids from mixed bottom fraction 65 results in clean bottom stream 310 containing reduced amounts of solids than bottoms stream 20, such as reduced amounts of coke. Reducing the amounts of solids in clean bottom stream reduces the opportunities for plugging in supercritical water unit 300. Cutterstock stream 60 can dilute bottoms stream 20 and the aromatics in cutterstock stream 60 can suppress radical reactions.

Figure 7:
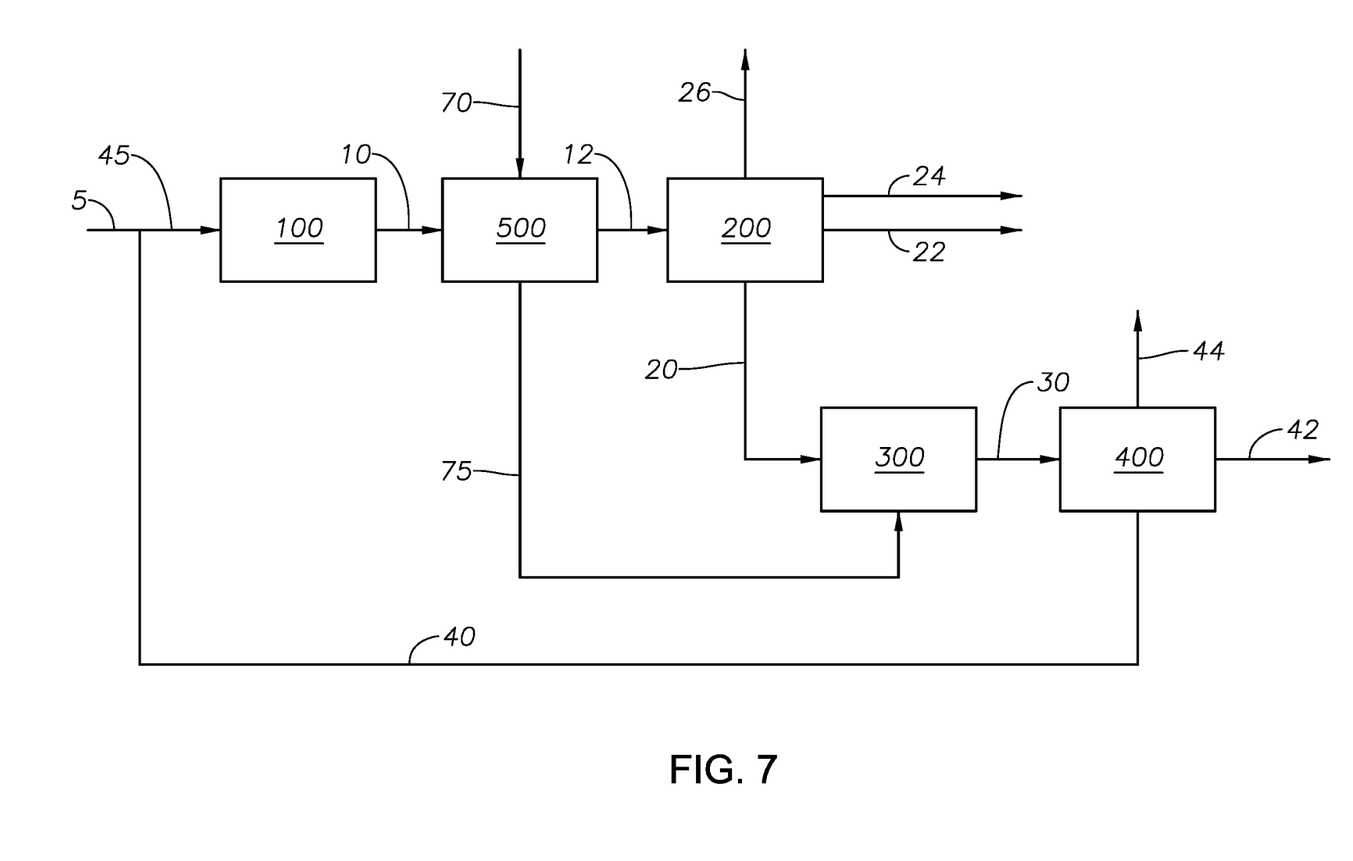
FIG. 7 provides a process diagram of an embodiment of the process.

An alternate embodiment described with reference to FIG. 7 and referring to FIG. 1 and FIG. 4. Visbreaker product stream 10 can be introduced to heat exchanger 500. Heat exchanger 500 can be any type of heat exchanger capable of removing heat from visbreaker product stream 10 and introducing the removed heat to another process stream. Heat exchanger 500 can be a shell and tube cross exchanger. The temperature of visbreaker product stream 10 can be reduced in heat exchanger 500 to produce cooled visbreaker product 12. The temperature of cooled visbreaker product 12 can be in the range between 50 deg C. and 300 deg C.

Water stream 70 can be introduced to heat exchanger 500. Water stream 70 can be a demineralized water having a conductivity less than 1.0 microSiemens per centimeter ($\mu$S/cm), alternately less 0.5 $\mu$S/cm, and alternately less than 0.1 $\mu$S/cm. In at least one embodiment, water stream 70 is demineralized water having a conductivity less than 0.1 $\mu$S/cm. Water stream 70 can have a sodium content of less than 5 micrograms per liter ($\mu$g/L) and alternately less than 1 $\mu$g/L. Water stream 70 can have a chloride content of less than 5 $\mu$g/L and alternately less than 1 $\mu$g/L. Water stream 70 can have a silica content of less than 3 $\mu$g/L.

The temperature of water stream 70 can be increased in heat exchanger 500 to produce heated water stream 75. The temperature of heated water stream 75 depends on the amount of heat energy removed from heat exchanger 500. The temperature of heated water stream 75 can be less than the critical temperature of water. Heated water stream 75 can be introduced to supercritical water unit 300 in place of water feed 320.

Figure 8:
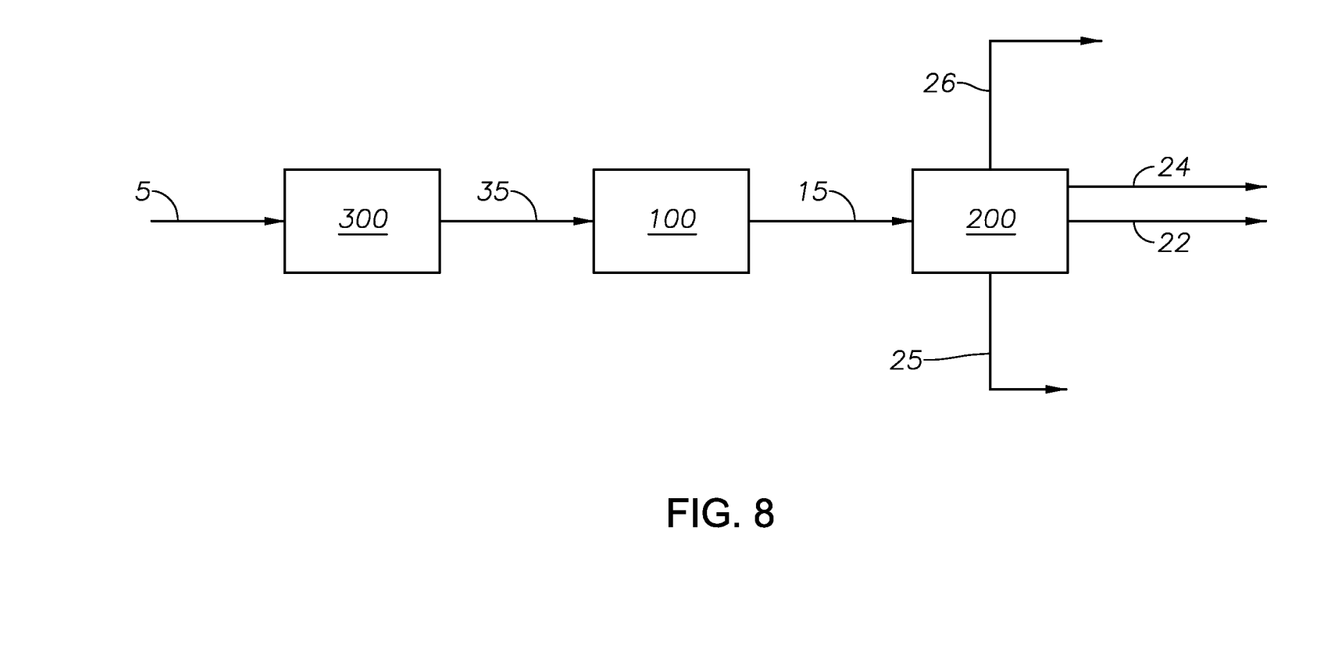
FIG. 8 provides a process diagram of an embodiment of the process.

An alternate embodiment is described with reference to FIG. 8 and referring to FIG. 1 and FIG. 3. Heavy oil 5 can be introduced to supercritical water unit 300. Supercritical water unit 300 can be described with reference to FIGS. 1 and 2. Heavy oil 5 can be processed in supercritical water unit 300 to produce upgraded heavy oil 35. Upgraded heavy oil 35 can be introduced to visbreaker unit 100.

Figure 2:
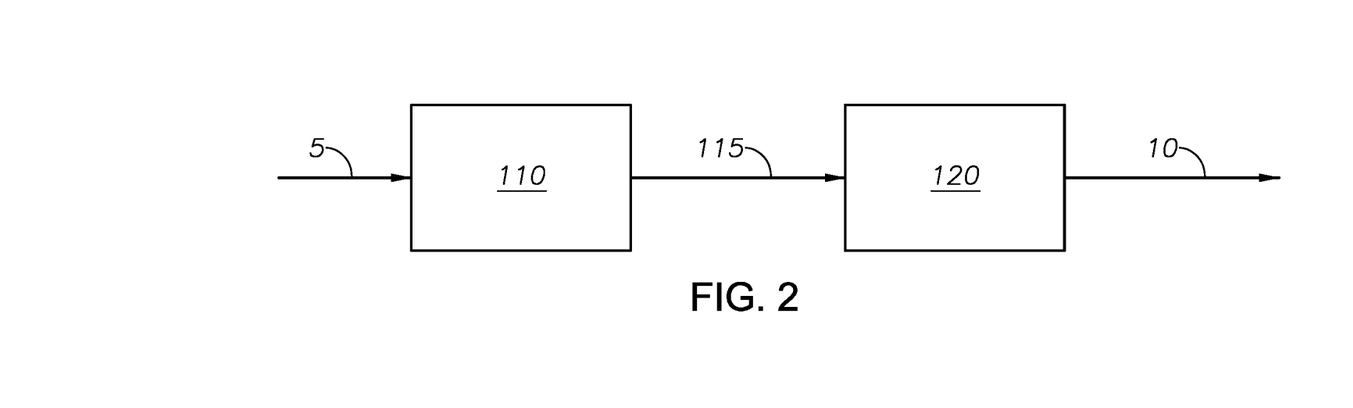
FIG. 2 provides a process diagram of an embodiment of the process.

Visbreaker unit 100 can operate as described with reference to FIG. 2. Visbreaker unit 100 can process upgraded heavy oil 35 to produce visbreaker effluent stream 15. Upgraded heavy oil 35 contains the hydrocarbons separated in oil-water separator 370. Visbreaker effluent stream 15 can be introduced to fractionator 200.

Fractionator 200 can operate as described with reference to FIG. 1. Fractionator 200 can separate visbreaker effluent stream 15 into gas product stream 26, naphtha stream 24, gas oil stream 22, and bottom fraction 25.

The embodiment described here with supercritical water unit 300 upstream of visbreaker unit 100 can be beneficial with heavier feedstock. Processing heavier feedstock in supercritical water unit 300 can increase conversion of the heavy fraction.

Figure 9:
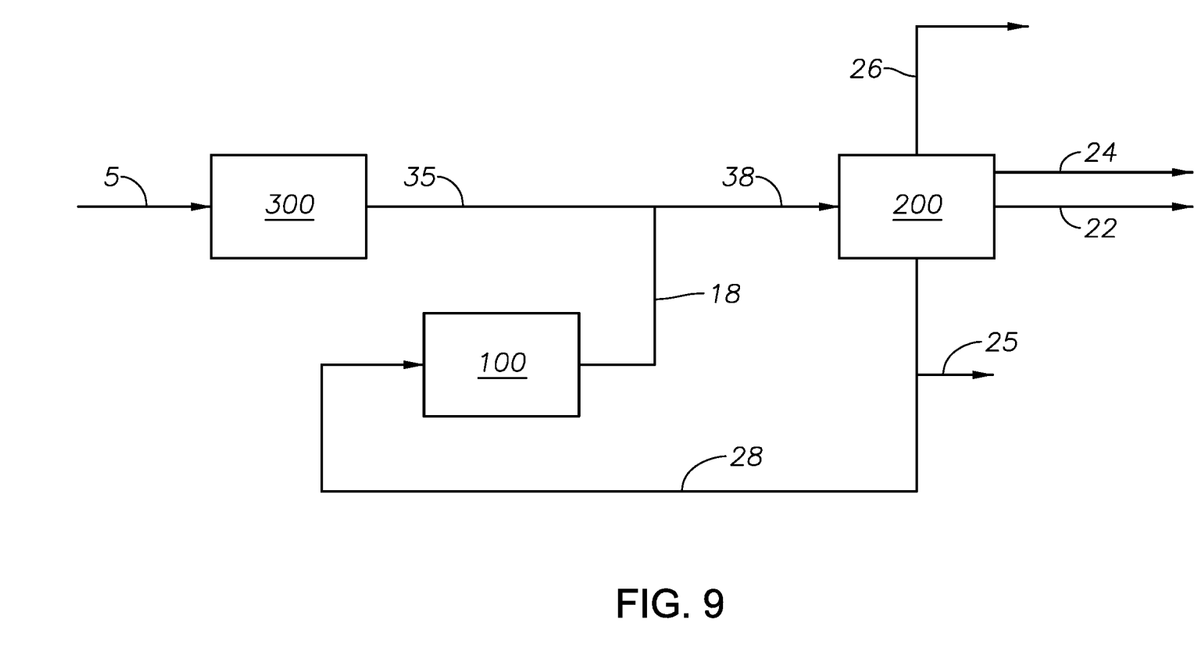
FIG. 9 provides a process diagram of an embodiment of the process.

In an alternate embodiment, as described with reference to FIG. 9 and referring to FIG. 1 and FIG. 8. Upgraded heavy oil 35 can be mixed with visbreaker product 18 to produce mixed product stream 38. Mixed product stream 38 can be introduced to fractionator 200.

Fractionator 200 can operate as described with reference to FIG. 1. Fractionator 200 can separate mixed product stream 38 to produce gas product stream 26, naphtha stream 24, gas oil stream 22, and bottom fraction 25. A slip stream can be separated from bottom fraction 25 as bottom split stream 28. Bottom split stream 28 can be introduced to visbreaker unit 100.

Bottom split stream 28 can be processed in visbreaker unit 100 to produce visbreaker product 18.

Advantageously, the integrated upgrading processes provide flexibility in operating the visbreaker unit. In the integrated upgrading processes, the visbreaker unit can be operated at standard severity and alternately at high severity. In embodiments where the visbreaker unit is the first process unit, the visbreaker unit can be operated at standard severity because the supercritical water can upgrade the bottom fraction and alternately the visbreaker unit can be operated at high severity because the supercritical water unit can have higher stability of converting the bottom fraction, due to better stability of fuel oil in supercritical water. In embodiments where the visbreaker unit is the second process unit, the visbreaker unit can be operated at standard severity because the supercritical water unit converts a portion of the heavy oil and alternately the visbreaker unit can be operated at high severity because the a heavy fraction of the heavy oil is converted in the supercritical water unit, such that there is less heavy fraction to produce coke in the visbreaker. Advantageously, the supercritical water unit can reduce the micro carbon residue (MCR) amount, micro carbon residue can serve as a precursor of coke, which can increase the liquid yield of visbreaker at high severity conditions.

In at least one embodiment, the integrated upgrading process is in the absence of added caustic.

EXAMPLES

Examples. The Example was conducted by a lab scale unit with a system as shown in FIGS. 1, 2, and 5.

Visbreaker unit 100 included a feed heater, a furnace, a soaker, and a fractionator. Heavy oil 5 was a vacuum residue fraction with a T5% of 925.4 deg F. The furnace outlet temperature in visbreaker unit 100 was 420 deg C., the temperature in the soaker of visbreaker unit 100 is 400 deg C., and the pressure throughout visbreaker unit 100 is 5 kilograms per square centimeter (kg/cm$^2$). The residence time in soaker in visbreaker unit 100 was 15 minutes.

Visbreaker product stream 10 was separated to produce gas oil stream 22 with a flow rate of 72 standard cubic feet per barrel-feed (scf/barrel-feed) and naphtha stream 24 with a T95% cut point of 350 deg F. and flow rate of 8.4 barrel/100 barrel-feed. Bottoms stream 20 contained the diesel fraction and the bottom fraction. Bottoms stream 20 had a moderate viscosity, such that the viscosity was less than 1,200 centistokes (cSt) at 50 deg C. The conversion to distillate was limited in the visbreaker. Additionally, the diesel cannot be produced because of the viscosity of bottoms stream 20. The properties of bottoms stream 20 reflect the limited severity conditions in visbreaker unit 100. The properties of heavy oil 5 and bottoms stream 20 are shown in Table. 1

TABLE 1

Composition of heavy oil and bottoms stream

| Properties | Heavy Oil 5 | Bottoms Stream 20 |
|---|---|---|
| API (deg) | 5.2 | 7.5 |
| Viscosity at 200 deg F. (cSt) | 3302 | |
| Viscosity at 210 deg F. (cSt) | 2230 | 450 |
| Viscosity at 220 deg F. (cSt) | 1526 | |
| Sulfur Concentration (%) | 5.10 | 4.7 |
| C7-asphalthene (%) | 15.5 | 20.0 |
| Toluene Insoluble (0.7%) | 0.7 | 3.8 |
| MCR | 67 | 20.34 |
| Distillation (SIMDIST, ASTM D-7169) | | |
| T5% cut point | 925.4 | 807.0 |
| T20% cut point | 1015.2 | 958.7 |
| T30% cut point | 1054.3 | 1004.4 |
| T40% cut point | 1089.7 | 1041.9 |
| T50% cut point | 1124.8 | 1074.8 |
| T60% cut point | 1162.3 | 1109.6 |
| T70% cut point | 1202.3 | 1148.8 |
| T80% cut point | 1247.8 | 1193.9 |
| T90% cut point | 1298.5 | 1250.8 |
| T95% cut point | 1325.2 | 1286.4 |

Table 2 discloses the results of the Curie Point Pyrolysis test. Curie Point Pyrolysis is an analytical method that can characterize product from thermal cracking samples. A small sample, around 0.2 milligrams (mg), is placed in a ferromagnetic pyrolysis foil. The sample containing pyrolysis foil is then subjected to induction heating to reach "Curie Point" in less than 0.2 seconds. The Curie Point is the temperature at which a magnetic material loses its magnetic property. The product from the pyrolysis is transferred to a gas chromatograph mass spectrometer (GC-MS) for analysis. The process is further described at http://www.jai.co.jp/english/products/py/index.html. The examples used a JCI-22 from Jai Co. (Tokyo, Japan) coupled with an Agilent GC-6890 gas chromatograph from Agilent Technologies (Wilmington, Del.) having mass spectrometer (MSD). By weighing the mass of pyrolysis foil before and after subjecting the sample to induction heating, the process can estimate the amount of volatiles that are generated instantly for a given temperature.

TABLE 2

Results from Curie Point Pyrolysis test

| Pyrolysis Temperature | Volatiles in Heavy Oil 5 (%) | Volatiles in Bottoms Stream 20 (%) |
|---|---|---|
| 500 deg C. | 44 | 31 |
| 920 deg C. | 62 | 69 |

As shown in Table 2, bottoms stream 20 has a reduced volatile amount as compared to heavy oil 5, a vacuum residue fraction, at 500 deg C. pyrolysis. In contrast, bottoms stream 20 has an increased amount of volatiles as compared to heavy oil 5 at pyrolysis temperature of 920 deg C.

Visbreaking is a thermal cracking process. Even after being treated in visbreaker unit 100, bottoms stream 20 contains a certain amount of components that are volatile at high temperature pyrolysis. The difference between molecular distributions of volatiles in heavy oil 5 and bottoms stream 20, as analyzed by GC-MS, is due to the paraffins having carbon number less than 10. Treatment of heavy oil 5 in visbreaker unit 100 can generate more paraffins having a carbon number of less than 10, meaning that bottoms stream 20 has an increased amount of breakable C10 alkane chains as compared to heavy oil 5. The paraffins can be produced by recombination of alkanes and alkenes with heavy molecules in visbreaking unit 100. Supercritical water unit 300 harnesses the remained and "rich" alkanes.

Bottoms stream 20 was mixed with cutterstock 60 to produce mixed bottom fraction 65 such that mixed bottom fraction 65 has a reduced viscosity compared to bottoms stream 20 for even pumping to supercritical water unit 300. Cutterstock 60 was a gas oil stream having 1.44 wt % sulfur, an aromatic content of 28 volume percent (vol %), and an API gravity of 35 Mixed bottom fraction 65 had a viscosity of 180 cSt at 122 deg F. Mixed bottoms fraction 65 can contain 75 wt % bottoms stream 20 and 25 wt % cutterstock 60.

Water feed 320 was a demineralized water having a conductivity of 0.055 μS/cm.

Mixed bottoms fraction 65 was pumped at a rate of 0.26 liters per hour (L/hr) in a diaphragm pump. Water feed 320 was pumped at a rate of 1.11 L/hr in a diaphragm pump. The ratio of the volumetric flow rate of oil to water was 0.23 to 1 at SATP. The pressure was maintained at 3,750 psig by a back pressure regulator. Oil heater 316 and water heater 326 were both electric heaters. The temperature of hot bottoms stream 318 was 120 deg C. The temperature of supercritical water stream 328 was 450 deg C.

Supercritical water reactor 330 was three tubular reactors each having 160 ml internal volume. The reactors were arranged in series. The flow direction in each reactor was downflow. Each reactor was set to a reactor temperature of 400 deg C. measured by thermocouples located at the outlet of each reactor to measure the temperature of the internal fluid of each reactor. The residence time in each reactor was 3.7 minutes. Residence time was calculated by assuming the fluid (both the hydrocarbons and the water) in the reactor was water with a density of 0.17716 g/ml at 400 deg C. and 3750 psig. The total flow rate at 400 deg C. and 3750 psig was 7.73 L/hr. Cooled stream 345 was at a temperature of 80 deg C. Discharged stream 355 was at ambient pressure. Discharged stream 355 was separated into gas phase stream 362 and liquid phase stream 365. The amount in gas phase stream 362 was less than 1 wt % of the amount in mixed bottoms fraction 65. Liquid phase stream 365 was separated into upgraded bottoms stream 30 and used water stream 375. The total mass balance of oil was within 2 wt %. The properties of upgraded bottoms stream 30 are in Table 3.

TABLE 3

Stream Properties

| | Bottoms Stream 20 | Mixed Bottom Fraction 65 | Upgraded Bottoms Stream 30 |
|---|---|---|---|
| API | 7.5 | 13.1 | 15.1 |
| Sulfur Concentration (%) | 4.7 | 3.7 | 3 |
| MCR | 20.3 | 18.2 | 7.5 |
| Viscosity (cSt, 122 deg F.) | 450 (@ 210 deg F.) | 532 | 147 |
| Diesel Fraction (wt %) | 0 | 25 | 4 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A system for upgrading a heavy oil, the system comprising:
    a supercritical water unit, the supercritical water unit configured to process the heavy oil to produce an upgraded heavy oil;
    a mixer fluidly connected to the supercritical water unit and a visbreaker unit, the mixer configured to mix the entirety of the upgraded heavy oil with the entirety of a visbreaker product to produce a mixed product stream;
    a fractionator fluidly connected to the mixer, the fractionator configured to separate the mixed product stream to produce a bottom fraction; and
    a visbreaker unit fluidly connected to the fractionator, the visbreaker unit configured to process the bottom fraction to produce the visbreaker product.

2. The system of claim 1, wherein the heavy oil is selected from the group consisting of a vacuum residue, an atmospheric residue, a fluid catalytic cracking clarified slurry oil having a T5% cut point of greater than 600 deg F., a naphtha steam cracker pyrolysis fuel oil, and residue streams.

* * * * *